United States Patent
Sun et al.

(10) Patent No.: US 8,087,637 B2
(45) Date of Patent: Jan. 3, 2012

(54) SELF-REGULATING VALVE FOR CONTROLLING THE GAS FLOW IN HIGH PRESSURE SYSTEMS

(75) Inventors: Fanping Sun, Glastonbury, CT (US); Zaffir Chaudhry, South Glastonbury, CT (US); Muhidin A. Lelic, Manchester, CT (US)

(73) Assignee: Chubb International Holdings Limited, Sunbury-On-Thames, England (GB)

( * ) Notice: Subject to any disclaimer, the term of this patent is extended or adjusted under 35 U.S.C. 154(b) by 691 days.

(21) Appl. No.: 11/918,092

(22) PCT Filed: Apr. 7, 2005

(86) PCT No.: PCT/US2005/012790
§ 371 (c)(1),
(2), (4) Date: Dec. 11, 2008

(87) PCT Pub. No.: WO2006/110148
PCT Pub. Date: Oct. 19, 2006

(65) Prior Publication Data
US 2009/0173900 A1    Jul. 9, 2009

(51) Int. Cl.
*F16K 31/12* (2006.01)
(52) U.S. Cl. .......... 251/31; 251/30.02; 251/144
(58) Field of Classification Search .......... 251/30.01, 251/30.02, 31, 144
See application file for complete search history.

(56) References Cited

U.S. PATENT DOCUMENTS

| | | | | |
|---|---|---|---|---|
| 2,655,940 A | * | 10/1953 | Jackson | 137/625.63 |
| 2,732,860 A | * | 1/1956 | Ray | 137/625.64 |
| 3,980,270 A | | 9/1976 | Thomas | |
| 3,990,516 A | | 11/1976 | Christensen et al. | |
| 4,014,509 A | | 3/1977 | Yoshino et al. | |
| 4,023,593 A | | 5/1977 | Piccardo | |
| 4,126,293 A | * | 11/1978 | Zeuner et al. | 251/30.01 |
| 4,194,719 A | * | 3/1980 | Ewald et al. | 251/30.01 |
| 6,152,178 A | * | 11/2000 | Hirota et al. | 137/625.43 |

FOREIGN PATENT DOCUMENTS

CH    403423 A    11/1965
EP    1363052 A1   11/2003

OTHER PUBLICATIONS

European Search Report, mailed Dec. 3, 2010.
European Patent Office, Office Action, Mar. 22, 2011, 6 pages.

* cited by examiner

*Primary Examiner* — John Fristoe, Jr.
(74) *Attorney, Agent, or Firm* — Kinney & Lange, P.A.

(57) ABSTRACT

A controlled pressure release valve controls the gas flow in high-pressure systems. The valve includes a valve body, a slidable spool, a primary flow passage, a first and second chamber, a first and second spring, a first and second passages, and a valve actuator. The valve body has a gas inlet and a gas outlet and houses the slidable spool. The slidable spool has a first end and a second end, and is slidable between a first position and a second position. The primary flow passage connects the gas inlet and the gas outlet and increases with lineal movement of the slidable spool. The first chamber is located adjacent the first end of the slidable spool and a second chamber is located adjacent the second end of the slidable spool. The sliding spool is biased toward the first position by a gas pressure applied by the second chamber and the second spring.

17 Claims, 9 Drawing Sheets

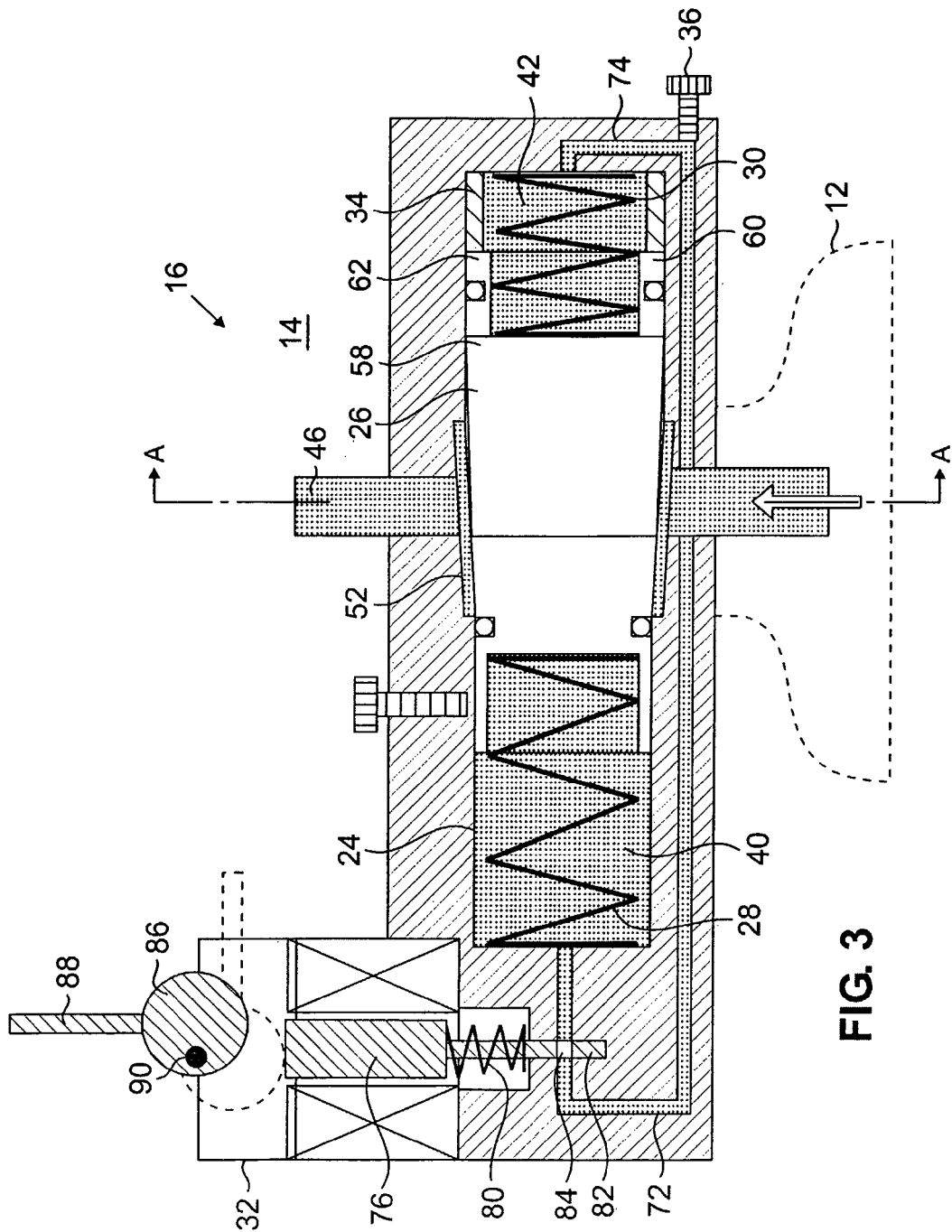

SELF-REGULATING VALVE FOR CONTROLLING THE GAS FLOW IN HIGH PRESSURE SYSTEMS

BACKGROUND OF THE INVENTION

Hazard suppression systems have long been employed for protecting areas containing valuable equipment or components, such as art galleries, data centers, and computer rooms. Traditionally, these systems utilize Halon, which is ideal for hazard suppression because it is capable of very quickly suppressing a hazard, it can be stored at relatively low pressures, and only a relatively small quantity is required.

However, in recent years the adverse environmental effects of Halon on the ozone have become evident, and many governmental agencies have banned further use of Halon. In some countries, existing Halon systems are being replaced by system using more environmentally friendly inert gases such as nitrogen, argon, carbon dioxide, and mixtures thereof. Unlike the Halon-based fire suppression systems, inert gas-based systems use natural gases and do not contribute to atmospheric ozone depletion.

Combustion occurs when fuel, oxygen, and heat are present in sufficient amounts to support the ignition of flammable material. Inert gas fire suppression systems are based on reducing the level of oxygen in an enclosure to a level that will not sustain combustion. In order to extinguish a fire, inert gas stored in a large number of high-pressure cylinders is released into the enclosure to reduce the concentration of oxygen by displacing oxygen with the inert gas until combustion is extinguished. Typically, ambient air comprises 21% concentration by volume of oxygen. This concentration must be reduced to below 14% to effectively extinguish the fire. To reach this objective, a relatively large volume of gas must be released.

There are health and safety implications for facility personnel, particularly in relation to the reduction of oxygen in the atmosphere once the system is discharged. Careful calculation is required to ensure that the concentration of inert gas released is sufficient to control combustion, yet not so high as to pose a serious risk to personnel.

The replacement of Halon with inert gas for fire protection presents two issues with the system design. First, the delivery of a large amount of gas into a protected room within a short period time (fire codes in some countries require that the gas be delivered in less than one minute) may generate overpressure in the room which could potentially damage equipment in the room. Current industrial practice is to use a special, expensive vent in the room to prevent the overpressure. Second, unlike Halon, inert gas is stored under normal room temperature in gaseous form, rather than liquid form. To reduce the storage vessel volume, a very high pressure is preferred, typically around 100 bar. As a result, the gas distribution system must be capable of withstanding extremely high pressures. These two limitations are key factors in the cost of both new installation and retrofit.

The overpressure in the protected room is primarily caused by an uneven discharge of the inert gas from the pressure vessel. The pressure in the gas vessel decays exponentially during gas release, so the overpressure typically occurs in the first few seconds of the discharge. If the gas release can be throttled to a fairly uniform pressure profile over the duration of the discharge, overpressure in the protected room can be prevented while ensuring that the predetermined amount of inert gas is delivered within the required time.

Throttling the gas flow requires a valve with a controllable variable opening area. While this can be performed by a closed-loop servo valve, high initial and maintaining costs make it an unfavorable approach for fire protection. In addition, the increased system complexity of a closed-loop control can also introduce reliability concerns.

BRIEF SUMMARY OF THE INVENTION

A controlled pressure release valve of the present invention controls the gas flow in high pressure systems. The valve includes a valve body, a slidable spool, a primary flow passage, a first and second chamber, a first and second spring, a valve actuator, and a first and second passage. The valve body has a gas inlet and a gas outlet and houses the slidable spool. The slidable spool has a first end and a second end, and is slidable between a first position and a second position. The primary flow passage connects the gas inlet and the gas outlet and increases with lineal movement of the slidable spool. The first chamber is located adjacent the first end of the slidable spool and a second chamber is located adjacent the second end of the slidable spool. The sliding spool is biased toward the first position by a gas pressure applied by the second chamber and the second spring. When the valve actuator is actuated, the first passage is opened to allow gas into the first chamber. The slidable spool is urged to the second position at a rate that is a function of the first and second spring forces and a pneumatic pressure differential in the first and second chambers.

BRIEF DESCRIPTION OF THE DRAWINGS

FIG. 3 is a sectional view of the first embodiment of the self-regulating valve in an open position in accordance with the present invention.

DETAILED DESCRIPTION

Figure 1:
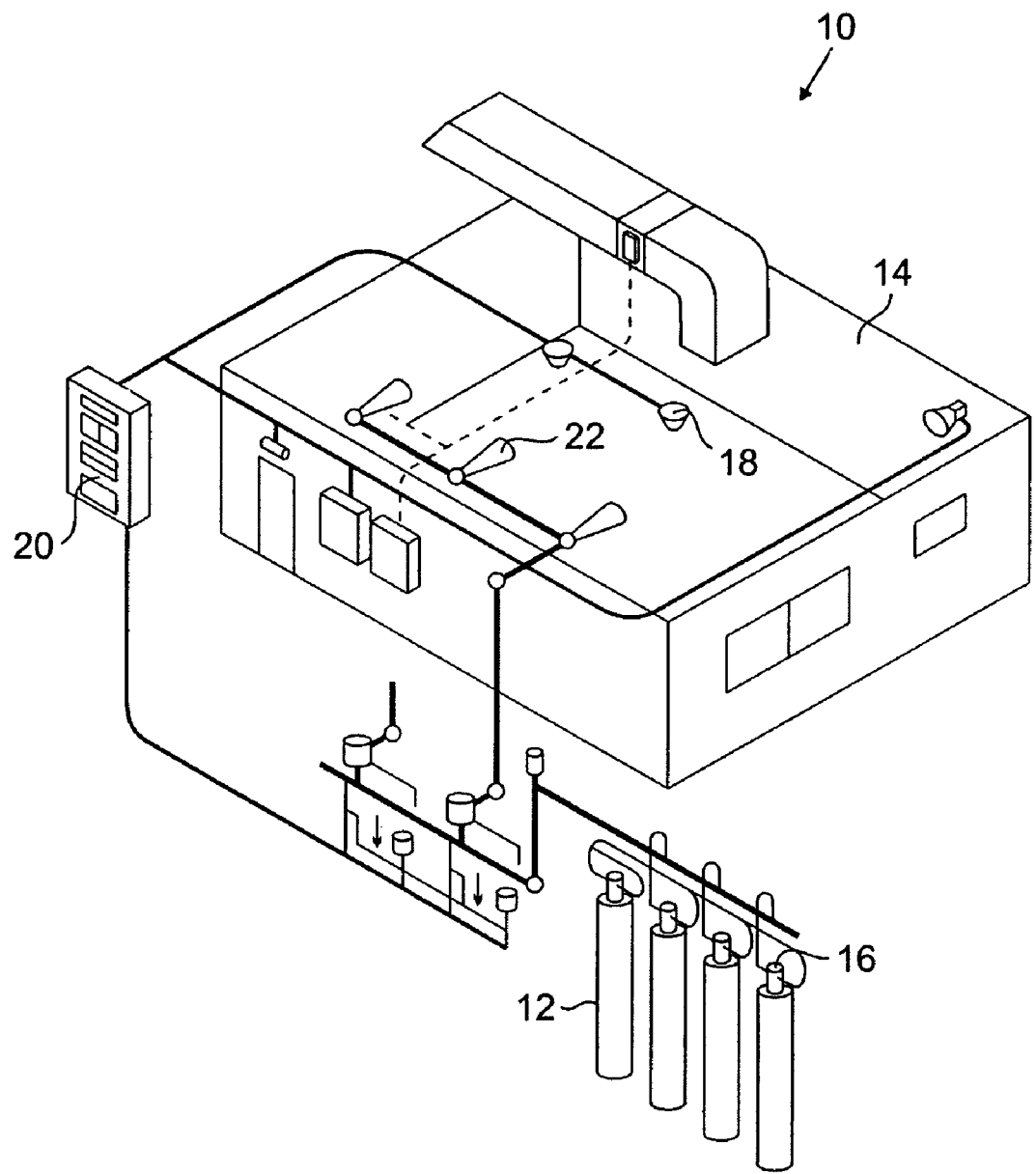
FIG. 1 is a schematic representation of a fire-suppression system in accordance with the present invention.

FIG. 1 is a schematic representation of an inert gas-based fire suppression system 10. A plurality of inert gas storage cylinders 12 are located in a storage area or room proximate an enclosed room 14 to be protected. Inert gas storage cylinders 12 contain inert gas to be released into protected room 14 in case of a fire or other hazard. Associated with each cylinder 12 is an open-loop pneumatic sliding self-regulating valve 16 for controllably releasing gas into protected room 14. When a fire is detected in protected room 14 by a fire detector 18 located in protected room 14, a control panel 20 opens self-regulating valves 16. Gas is then discharged into protected room 14 through discharge nozzles 22 to deplete the concentration of oxygen in protected room 14 and extinguish the fire.

Figure 2:
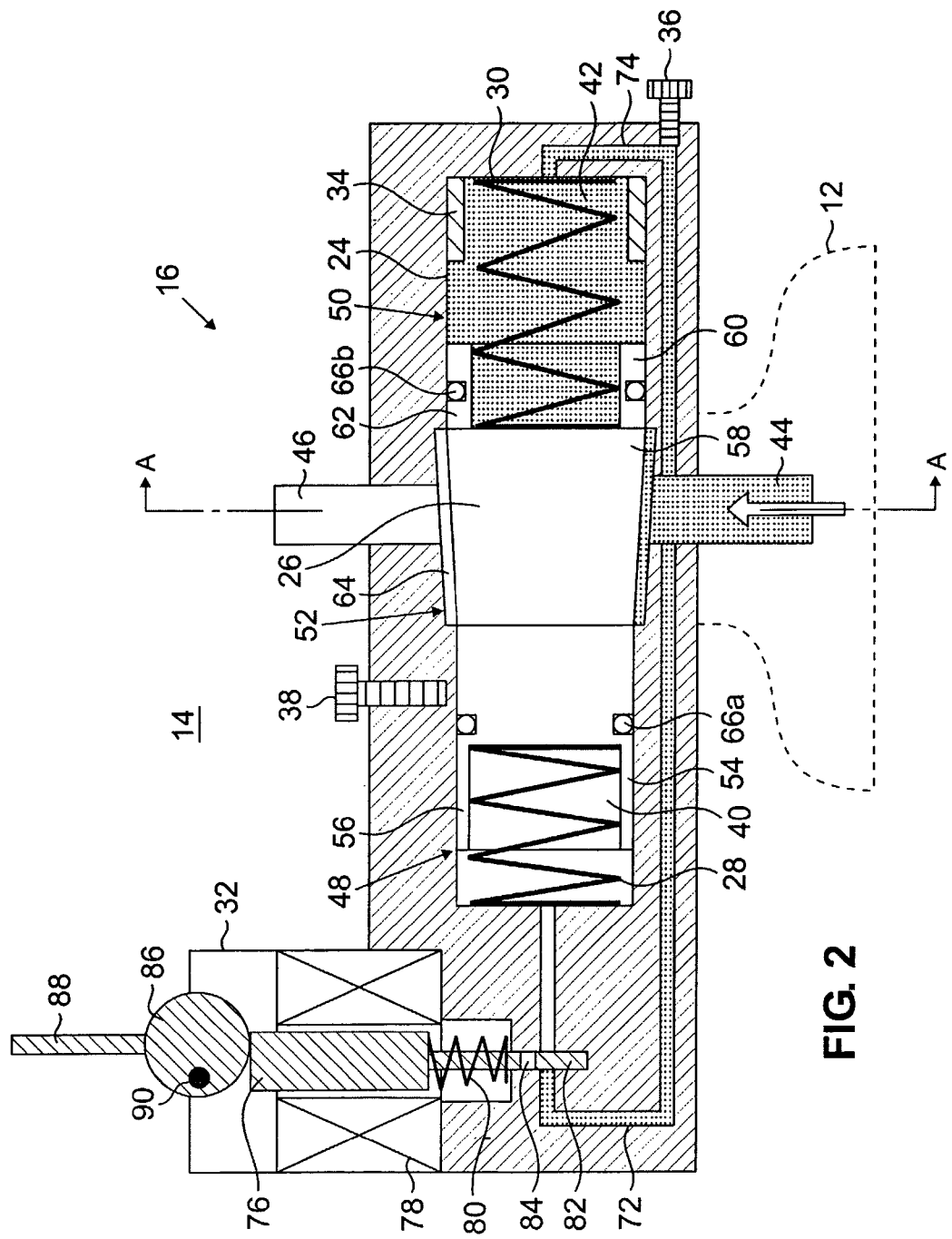
FIG. 2 is a sectional view of a first embodiment of a self-regulating valve in a closed position in accordance with the present invention.
Figure 3A:
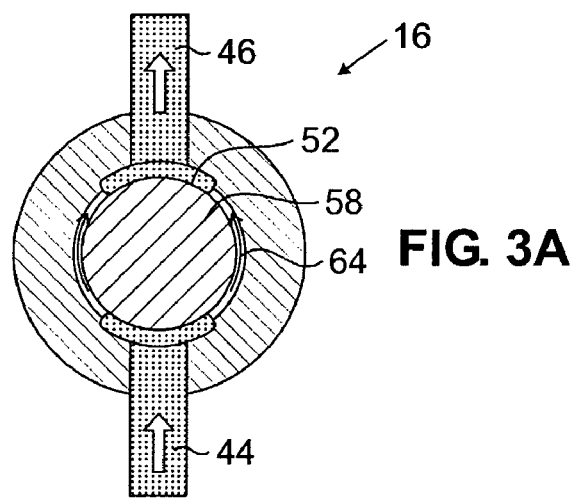
FIG. 3A is a cross-sectional view of the first embodiment of the self-regulating valve in the open position in accordance with the present invention.
Figure 4A:
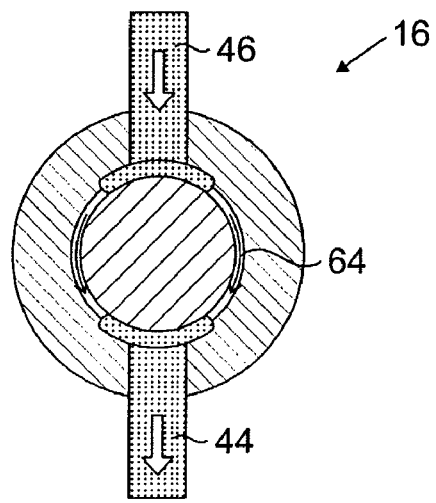
FIG. 4A is a cross-sectional view of the first embodiment of the self-regulating valve in the charging position in accordance with the present invention.
Figure 4:
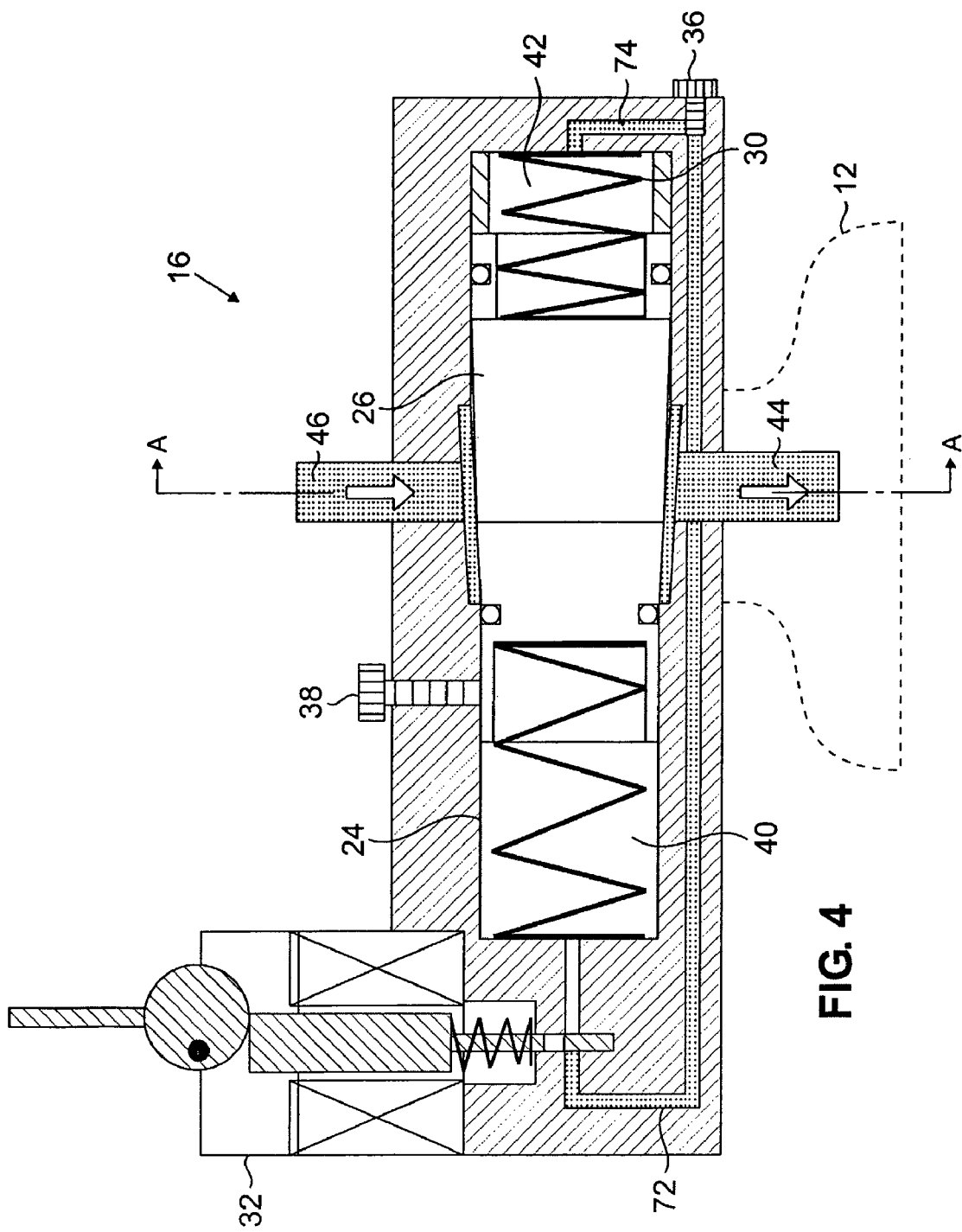
FIG. 4 is a sectional view of the first embodiment of the self-regulating valve in a charging position in accordance with the present invention.

FIGS. 2-4 show sectional views of a first embodiment of self-regulating valve 16 in a fully closed position, a fully open position, and a recharging position, respectively. FIGS. 2A-4A show cross sectional views of self-regulating valve 16 at lines A-A when self-regulating valve 16 is closed, open, and recharging, respectively. FIG. 2 is a sectional view of self-regulating valve 16 in the fully closed position mounted on cylinder 12. Self-regulating valve 16 generally includes valve body 24, slidable spool 26, first spring 28, second spring 30, solenoid valve 32, ring stop 34, plug screw 36, and stop screw 38. Self-regulating valve 16 throttles the release of inert gas from cylinder 12 in order to control the pressure discharge into protected room 14.

Valve body 24 generally comprises activation (first) chamber 40, back pressure (second) chamber 42, gas inlet 44, and gas outlet 46. Valve body 24 has a first end 48, a second end 50, and a valve seat section 52 located between first and second ends 48 and 50. Spool 26 is housed in valve body 24 and is slidable between first end 48 and second end 50 of valve body 24. Valve body 24 and spool 26 form activation chamber 40 at first end 48 of valve body 24 and back pressure chamber 42 at second end 50 of valve body 24. Spool 26 is in a first (closed) position relative to valve body 24 when spool 26 is proximate first end 48 and is in a second (open) position relative to valve body 24 when spool 26 is proximate second end 50.

Spool 26 is sized to slidably engage valve body 24 and has a head portion 54 comprised of a flange 56 along the circumference of head 54, a conical mid-section 58, and a tail portion 60 comprised of a flange 62 along the circumference of tail 60. Diameter $D_T$ of tail 60 is larger than diameter $D_H$ of head 54. Diameter $D_C$ of conical section 58 increases in diameter from head 54 to tail 60. As shown in FIG. 2, when spool 26 is in the first position, conical section 58 sits in valve seat 52 of valve body 24. Because conical valve seat 52 has the same diameter $D_C$ as conical section 58, when conical section 58 sits in valve seat 52, conical section 58 seals a primary flow passage 64 located between gas inlet 44 and gas outlet 46 such that gas cannot pass through gas inlet 44 to gas outlet 46. Head 54 carries O-ring 66a and tail 58 carries O-ring 66b that contact valve body 24 and seal any air passages between valve body 24 and spool 26. O-rings 66a and 66b ensure that gas does not escape from activation chamber 40 or back pressure chamber 42 through primary flow passage 64.

Activation chamber 40 is located at first end 48 of valve body 24. Both activation chamber 40 and first end 48 have a diameter $D_1$ sized to accept head 54. When spool 26 is in the first position, activation chamber 40 receives head 54 of spool 26 such that conical section 58 of spool 26 abuts first end 48 of valve body 24. Because diameter $D_C$ of conical section 58 is larger than diameter $D_1$ of first end 48, first end 48 cannot accept conical section 58. Spool 26 is thus fully in the first position when conical section 58 abuts first end 48 and compresses first spring 28 located in activation chamber 40. First spring 28 is a compression spring and resists compression when in a relaxed state. Gas passes from cylinder 12 to activation chamber 40 through a first passage 72 when self-regulating valve 16 is activated.

Back pressure chamber 42 is located at second end 50 of valve body 24 and has a diameter $D_2$, which is slightly larger than diameter $D_1$ of first end 48. Diameter $D_2$ of back pressure chamber 42 is sized to accept tail 60. Ring stop 34 is located in back pressure chamber 42 and is sized to engage flange 62 of tail 60 when spool 26 moves toward the second position. Second spring 30 is located in back pressure chamber 42 and is fully extended when spool 26 is in the first position. Back pressure chamber 42 is connected to cylinder 12 by second passage 74 and has the same pressure as cylinder 12 when spool 26 is in the first position.

Solenoid valve 32 is located between gas inlet 44 and activation chamber 40 and controls the flow of gas through first passage 72. Solenoid valve 32 generally includes solenoid core 76, solenoid coils 78, spring 80, and needle valve 82 having a passage 84. Spring 80 biases solenoid core 76 towards a closed position. Needle valve 82 is connected to solenoid core 76 and is positioned relative to first passage 72. When solenoid valve 32 is closed, passage 84 of needle valve 82 is not aligned with first passage 72, blocking gas from entering activation chamber 40 through first passage 72. A cam 86 having a lever 88 and pivot point 90 are positioned to engage solenoid core 76 as a manual override if control panel 20 (shown in FIG. 1) or solenoid coil 78 is not functioning properly.

When spool 26 is in the first position, second passage 74 and back pressure chamber 42 are filled with inert gas from cylinder 12 and have the same pressure as cylinder 12. Gas from cylinder 12 cannot pass through first passage 72 into activation chamber 40 because solenoid valve 32 is closed and first passage 72 is blocked. This differential pressure between the initial low pressure in activation chamber 40 and the initial high pressure in back pressure chamber 42 urges spool 26 toward the first position. Spool 26 is also biased toward activation chamber 40 by second spring 30. In this position, conical section 58 engages valve seat 52 to seal primary flow passage 64, maintaining self-regulating valve 16 in the closed position.

Figure 2A:
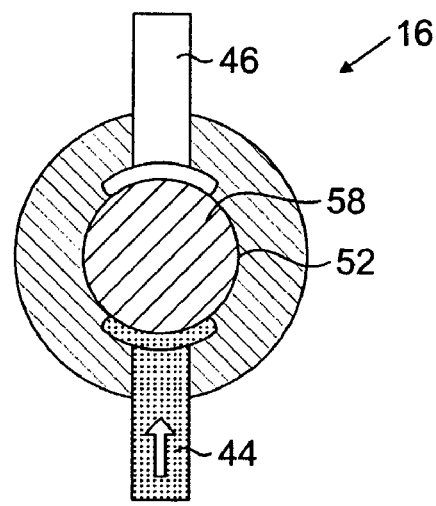
FIG. 2A is a cross-sectional view of the first embodiment of the self-regulating valve in the closed position in accordance with the present invention.

FIG. 2A is a cross-sectional view of self-regulating valve 16 in the closed position. The path of primary flow passage 64 is between valve seat 52 and conical section 58 (shown in FIG. 2). When self-regulating valve 16 is in standby for fire protection, solenoid valve 32 is powered off and first passage 72 is closed so that gas cannot enter activation chamber 40. The pressure differential between activation chamber 40 and back pressure chamber 42 keeps spool 26 in the first position with conical section 58 engaging valve seat 52 and sealing primary flow passage 64. As a result, gas cannot pass through primary flow passage 64 to gas outlet 46.

FIG. 3 is a sectional view of self-regulating valve 16 in the open position. When there is a need to discharge gas from cylinder 12, solenoid valve 32 is opened and gas is allowed to flow through first passage 72. Solenoid valve 32 is normally electrically activated by control panel 20 (shown in FIG. 1). In case of a power failure during a fire or other hazard, self-regulating valve 16 can also be opened manually by turning lever 88 at pivot point 90 by 90 degrees to activate cam 86 into contact with solenoid core 76. Solenoid core 76 is forced down and compresses spring 80 such that passage 84 of needle valve 82 is aligned with first passage 72. Once first passage 72 is opened, the pneumatic pressures in activation chamber 40 and back pressure chamber 42 and the spring forces of springs 28 and 30 control the velocity of spool 26 and the rate of gas discharge.

As gas flows through first passage 72 and into activation chamber 40, the pressure in cylinder 12 and chambers 40 and 42 begins to equalize. As self-regulating valve 16 approaches pressure equilibrium, spool 26 gradually moves to the second position as first spring 28 extends and second spring 30 compresses. It is primarily the spring restoring force of first spring 28 that drives spool 26 towards the second position. The counterforce provided by the net pneumatic force generated by the difference in area of head 54 and tail 58, spring 30, and friction between valve body 24 and spool 26 act to slow down the velocity of spool 26 so that overpressure does not occur in protected room 14. Spool 26 is in the second position and stops moving when flange 62 of tail 60 engages ring stop 34 of valve body 24.

The cross-section of primary flow passage 64 is proportional to the displacement of spool 26, and self-regulating valve 16 opens from a minimal to a maximal area when the displacement of spool 26 is a linear function of time. The rate of gas discharge can also be controlled by setting plug screw 36 in second passage 74.

As can be seen in FIG. 3A, when spool 26 moves from the first position to the second position, primary flow passage 64 is open and gas from cylinder 12 can pass through primary flow passage 64 and discharge at gas outlet 46. Because diameter $D_C$ of valve seat 52 is greater than the diameter $D_H$ of head 54, primary flow passage 64 gradually opens as conical section 58 disengages from valve seat 52 and the distance between spool 26 and valve seat 52 gradually increases. Thus, as spool 26 moves toward the second position, gas is able to pass around spool 26 through primary flow passage 46 to gas outlet 46. Gas continues to be discharged from flow control valve 16 until there is no longer enough pressure in valve body 24 to emit any more gas.

FIG. 4 shows self-regulating valve 16 after the gas in cylinder 12 has been discharged and self-regulating valve 16 needs to be recharged for subsequent use. After the inert gas has been released from cylinder 12 and self-regulating valve 16, spool 26 may be in an undefined position due to friction and spring biasing. As such, spool 26 needs to be properly positioned in valve body 24 prior to charging. Gas outlet 46 is capped off, opening second passage 74, and pressuring self-regulating valve 16 at gas inlet 44 to move spool 26 toward the second position and open primary flow passage 64.

Once spool 26 is properly positioned in valve body 24, valve body 24 can be charged to full pressure while mounted on cylinder 12. Stop screw 38 is first lowered into valve body 24 to secure spool 26 in position. Solenoid valve 32 is then closed to block first passage 72 and plug screw 36 is fully inserted into second passage 74 so that gas cannot enter back pressure chamber 42. Gas is passed through gas outlet 46, which is used as an inlet during the charging process, until cylinder 12 and valve body 24 are full. Once cylinder 12 and valve body 24 are fully charged, stop screw 38 is manually backed out of contact with spool 26 and plug screw 36 is screwed outward to open second passage 74 so that gas can enter back pressure chamber 42. Spool 26 returns to the first position under the spring loading of second spring 30 and the pneumatic force produced by gas in back pressure chamber 42, closing primary flow passage 64.

FIG. 4A is a cross-sectional view of self-regulating valve 16 during the charging process. When self-regulating valve 16 is charging, primary flow passage 64 is open to allow gas to pass into valve body 24 and cylinder 12.

Figure 5:
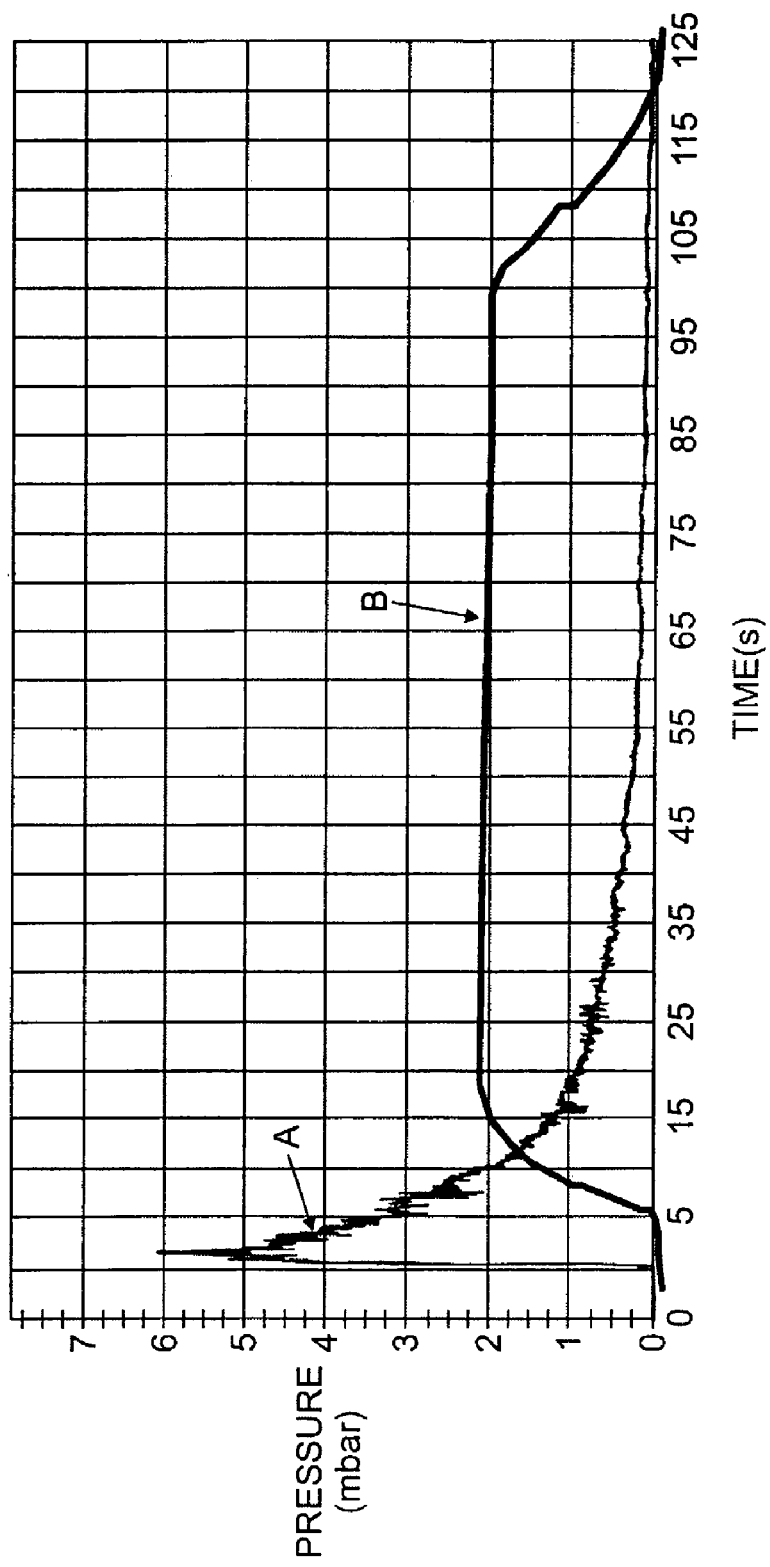
FIG. 5 is a graph comparing the rate of release of gas from a prior art self-regulating valve and the rate of release of gas from the self-regulating valve in accordance with the present invention.

FIG. 5 is a graph of rate of release of gas A from a prior art flow control valve and rate of release of gas B from self-regulating valve 16. As can be seen in FIG. 5, prior art flow control valves release gas into an enclosed room at a dangerously high pressure in a very short period of time. This can pose a danger to any personnel and equipment in the enclosed room when the gas is released. By contrast, self-regulating valve 16 releases gas into the enclosed room at a controlled rate. The initial rate of release of gas gradually increases and generally levels off as self-regulating valve 16 opens. As the gas in self-regulating valve 16 is released and the level of gas remaining in self-regulating valve 16 decays, the pressure in activation and back pressure chambers 40 and 42 and the rate of gas release gradually decrease until there is a nominal amount of gas left in self-regulating valve 16 and no more gas is emitted.

Figure 6:
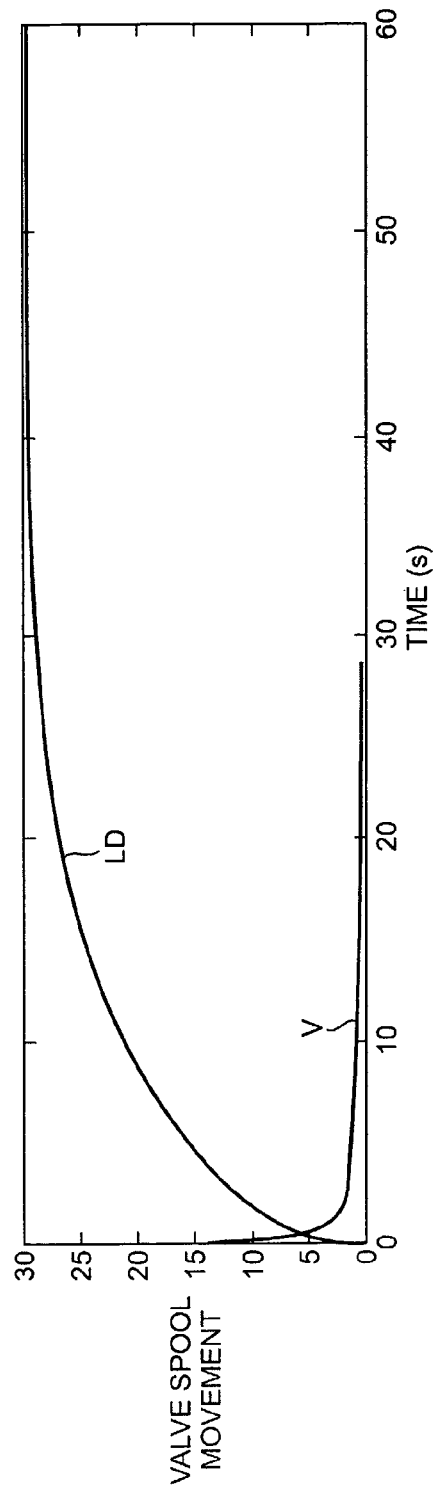
FIG. 6 is a graph of movement of a spool of the self-regulating valve in accordance with the present invention as a function of time.

FIG. 6 is a graph showing linear displacement LD and velocity V of spool 26 as a function of time. As spool 26 moves from the first position to the second position, the displacement of spool 26 relative to the first position gradually increases as a function of time until flange 62 of tail 60 engages ring stop 34 of valve body 24 and self-regulating valve 16 is fully open. In contrast, the velocity of spool 26 decreases as a function of time. The initial velocity of spool 26 must be large enough for spool 26 to break from valve seat 52. After spool 26 is displaced from valve seat 52, the velocity of spool 26 gradually decreases until spool 26 is in the second position and cannot move any further in valve body 24.

Figure 6A:
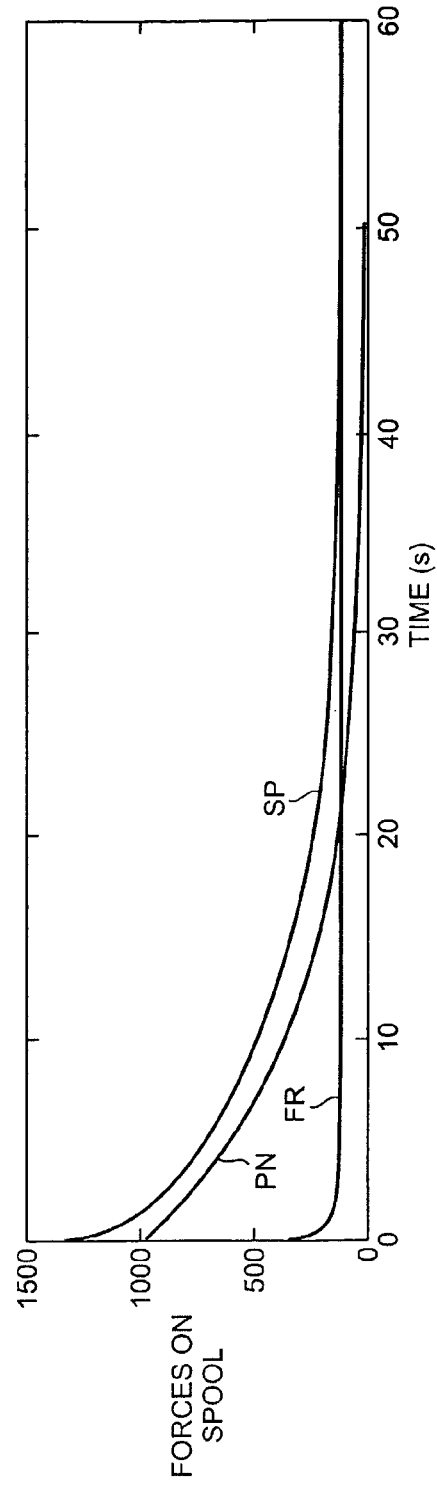
FIG. 6A is a graph of the forces on a spool of the self-regulating valve of the present invention as a function of time as it moves from the closed position to the open position.

FIG. 6A is graph showing the forces acting on spool 26 as self-regulating valve 16 opens. As spool 26 moves from the first position to the second position, spool 26 has pneumatic force PN, frictional force FR, and spring force SP acting on spool 26. As shown in FIG. 6, the displacement of spool 26 gradually increases over time as self-regulating valve 16 opens. The gradual increase is dependent on the velocity of spool 26 as it moves from the first position to the second position and primary flow passage 64 opens. The initial pressure in back pressure chamber 42 and frictional forces between spool 26 and valve body 24 provide resistance against first spring 28 as self-regulating valve 16 begins to open. As time passes, the force of first spring 28 overcomes both the pneumatic pressure differential and frictional forces, as well as the force of second spring 30, allowing primary flow passage 64 to fully open.

Figure 7:
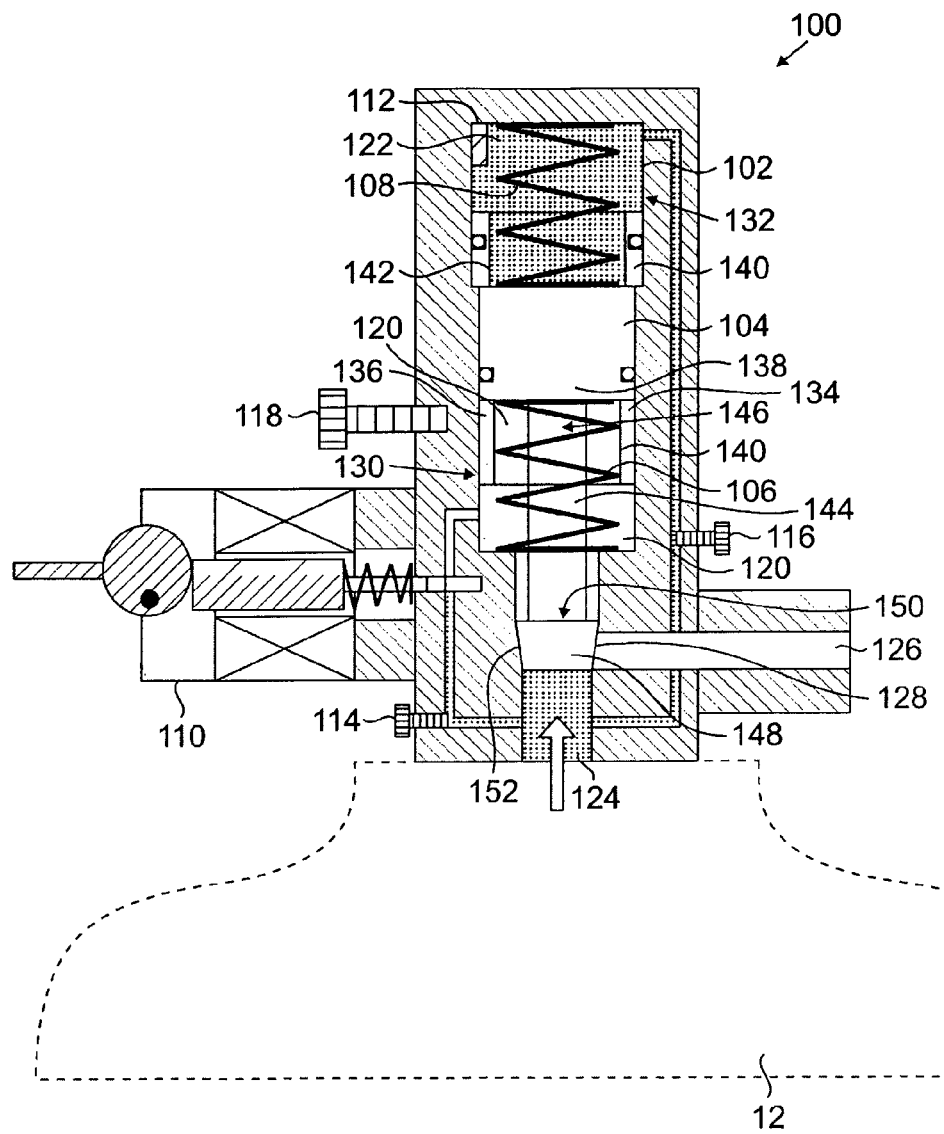
FIG. 7 is a sectional view of a second embodiment of the self-regulating valve in a closed position in accordance with the present invention.
Figure 8:
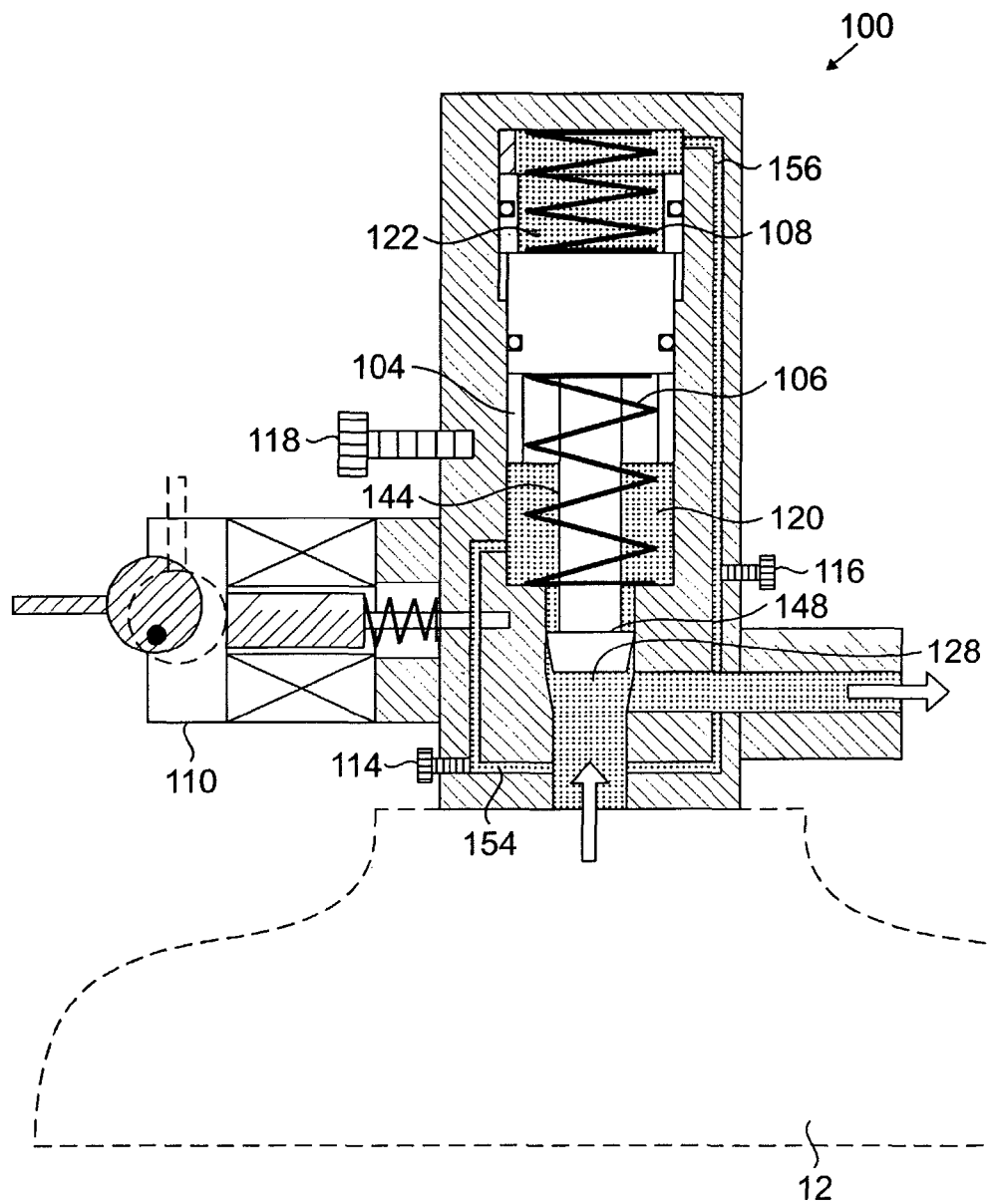
FIG. 8 is a sectional view of a second embodiment of the self-regulating valve in an open position in accordance with the present invention.

FIGS. 7 and 8 are sectional views of a second embodiment of self-regulating valve 100 in a closed position and in an open position, respectively. Although self-regulating valve 100 is structurally different from self-regulating valve 16 (discussed in FIGS. 2-4), self-regulating valve 100 functions primarily in the same manner as self-regulating valve 16. FIG. 7 shows self-regulating valve 100 in the closed position mounted on cylinder 12. Self-regulating valve 100 generally includes valve body 102, slidable spool 104, first spring 106, second spring 108, solenoid valve 110, ring stop 112, damping screw 114, plug screw 116, and stop screw 118.

Valve body 102 generally comprises activation chamber 120, back pressure chamber 122, gas inlet 124, gas outlet 126, and primary flow passage 128. Spool 104 is sized to slidably engage valve body 102 between a first end 130 and a second end 132 of valve body 102. Spool 104 generally includes a head portion 134 comprised of a flange 136 along the circumference of head 134, a cylindrical mid-section 138, a tail portion 140 comprised of a flange 142 along the circumference of tail 140, and a piston 144.

Valve body 102 and spool 104 interact with each other in the same manner as self-regulating valve 16 except that the cross-section of primary flow passage 128 is controlled by piston 144. Piston 144 is attached to cylindrical section 138 at a first end 146 between flange 136 of head 134 and comprises a piston head 148 at a second end 150 sized to engage a conical valve seat 152 of valve body 102. When self-regulating valve 100 is closed, piston head 148 seals primary flow passage 128 located between activation chamber 120, gas inlet 124, and gas outlet 126. When primary flow passage 128 is sealed, gas cannot pass through gas inlet 124 to gas outlet 126.

FIG. 8 is a sectional view of self-regulating valve 100 in the open position. When there is a need to discharge gas from cylinder 12, solenoid valve 110 is opened and gas flows through first passage 154 connecting cylinder 12 and activation chamber 120. As gas flows through first passage 154 and into activation chamber 120, the pressure in back pressure chamber 122 is gradually depleted through second passage 156 connecting back pressure chamber 122 and cylinder 12. The combination of the spring restoring force of first spring 106 and the pneumatic pressure in activation chamber 120 overcomes the frictional force on spool 104, the spring force of second spring 108 and pneumatic pressure in back pressure chamber 122. Spool 104 is pushed toward back pressure chamber 122, and self-regulating valve 100 opens. As pressure in cylinder 12 decays exponentially as a result of gas release, spool 104 gradually moves to the second position as first spring 106 extends and second spring 108 compresses until cylinder 12 pressure drops to zero.

The cross-section of primary flow passage 128 is a function of the displacement of spool 104 and piston head 148 of piston rod 144, and self-regulating valve 100 opens from a minimal to a maximal area linearly when the displacement of spool 104 is a linear function of time.

Once self-regulating valve 100 has been completely discharged, self-regulating valve 100 is designed to be charged in the same manner as self-regulating valve 16 (discussed in FIG. 4).

The self-regulating valve of the present invention controllably releases inert gas into an enclosed space upon detection of a fire or other hazard. The self-regulating valve has a spool housed in the valve body that is slidable from a first position to a second position. The slidable spool and the valve body form a control pressure chamber at one end of the valve body and a back pressure chamber at the opposite end of the valve body. The sliding spool is biased towards the first position by pressure in the back pressure chamber and a spring positioned in the back pressure chamber.

When the sliding spool is in the first position, a primary flow passage connecting the gas inlet and the gas outlet is fully closed. After a solenoid valve is actuated, gas is allowed to flow into the control pressure chamber. The spool gradually moves to the second position and gradually opens the primary flow passage. This allows gas to pass from the cylinder through the flow control valve and into the enclosed room. The competing forces of springs in the control activation chamber and the back pressure chamber, the pneumatic pressures in the control pressure chamber and the back pressure chamber, and the friction between the spool and the valve body control the rate of movement of the spool and the rate of gas release into the enclosed room.

Although the present invention has been described with reference to preferred embodiments, workers skilled in the art will recognize that changes may be made in form and detail without departing from the spirit and scope of the invention.

The invention claimed is:

1. A self-regulating valve for controlling gas flow in high pressure systems, the valve comprising:
    a valve body having a gas inlet and a gas outlet;
    a slidable spool housed in the valve body, the slidable spool having a first end and a second end and slidable between a first position and a second position;
    a primary flow passage connecting the gas inlet and the gas outlet, the primary flow passage increasing with lineal movement of the slidable spool;
    a first chamber located adjacent the first end of the slidable spool;
    a second chamber located adjacent the second end of the slidable spool, wherein the first chamber has a first diameter and the second chamber has a second diameter, the second diameter being greater than the first diameter;
    a first spring for applying a first spring force to the slidable spool toward the second position;
    a second spring for applying a second spring force to the slidable spool toward the first position;
    a first passage connecting the gas inlet and the first chamber;
    a second passage connecting the gas inlet and the second chamber; and
    a valve actuator for actuating the valve by opening the first passage to cause the slidable spool to move toward the second position.

2. The valve of claim 1, wherein a velocity of the slidable spool toward the second position after the first passage is opened is controlled by the first and second springs and a pneumatic pressure differential between the first and second chambers.

3. The valve of claim 1, wherein a position of the slidable spool relative to the second position after the first passage is opened is controlled by the first and second springs and a pneumatic pressure differential between the first and second chambers.

4. The valve of claim 1, wherein the valve actuator is a solenoid pilot valve.

5. The valve of claim 1, and further comprising a tapered valve seat for closing the primary flow passage when the slidable spool is in the first position and for opening the primary flow passage as the slidable spool moves to the second position.

6. The valve of claim 5, wherein the slidable spool further comprises a tapered body for engaging the tapered valve seat when the slidable spool is in the first position.

7. The valve of claim 1, and further comprising a protrusion for controlling the introduction of gas into the first chamber through the first passage.

8. The valve of claim 1, wherein the primary flow passage opens progressively from a minimal to a maximal area as the slidable spool is displaced lineally as a function of time.

9. An open loop pneumatic flow control valve for controlled gas flow in high pressure systems, the open loop pneumatic flow control valve comprising:
    a valve body having a first end and a second end, and a gas inlet and a gas outlet;
    a slidable spool housed within the valve body and slidable between a first position and a second position;
    a first spring for biasing the slidable spool toward the second position;
    a second spring for biasing the slidable spool toward the first position;
    a first chamber located at the first end of the valve body;
    a second chamber at the second end of the valve body;
    a primary flow passage between the gas inlet and the gas outlet, wherein the primary flow passage is closed when the slidable spool is in the first position, and wherein the primary flow passage is fully open when the slidable spool is in the second position;

a first passage connecting the gas inlet and the first chamber;

a second passage connecting the gas inlet and the second chamber; a valve actuator for actuating the valve by opening the first passage; and a tapered valve seat and a tapered closing body for opening and closing the primary flow passage.

10. The open loop pneumatic flow control valve of claim 9, wherein the primary flow passage opens progressively from a minimal to a maximal area as the slidable spool is displaced lineally as a function of time.

11. The open loop pneumatic flow control valve of claim 9, and further comprising a means for controlling the introduction of gas into the first chamber through the first passage when the first passage is open.

12. A self-regulating valve for controlling gas flow in high pressure systems, the valve comprising:

a valve body having a gas inlet and a gas outlet;

a slidable spool housed in the valve body, the slidable spool having a first end and a second end and slidable between a first position and a second position;

a primary flow passage connecting the gas inlet and the gas outlet, the primary flow passage increasing with lineal movement of the slidable spool;

a first chamber located adjacent the first end of the slidable spool;

a second chamber located adjacent the second end of the slidable spool;

a first spring for applying a first spring force to the slidable spool toward the second position;

a second spring for applying a second spring force to the slidable spool toward the first position;

a first passage connecting the gas inlet and the first chamber;

a second passage connecting the gas inlet and the second chamber;

a valve actuator for actuating the valve by opening the first passage to cause the slidable spool to move toward the second position; and a tapered valve seat for closing the primary flow passage when the slidable spool is in the first position and for opening the primary flow passage as the slidable spool moves to the second position.

13. The valve of claim 12, wherein the slidable spool further comprises a tapered body for engaging the tapered valve seat when the slidable spool is in the first position.

14. The valve of claim 12, wherein a velocity of the slidable spool toward the second position after the first passage is opened is controlled by the first and second springs and a pneumatic pressure differential between the first and second chambers.

15. The valve of claim 12, wherein a position of the slidable spool relative to the second position after the first passage is opened is controlled by the first and second springs and a pneumatic pressure differential between the first and second chambers.

16. The valve of claim 12, wherein the valve actuator is a solenoid pilot valve.

17. The valve of claim 12, wherein the primary flow passage opens progressively from a minimal to a maximal area as the slidable spool is displaced lineally as a function of time.

* * * * *